(12) United States Patent
Fay, II

(10) Patent No.: US 9,930,833 B2
(45) Date of Patent: Apr. 3, 2018

(54) TILT CYLINDER REMOTE ATTACHMENT APPARATUS

(71) Applicant: CNH Industrial America LLC, New Holland, PA (US)

(72) Inventor: Jeffrey B. Fay, II, Wilmington, DE (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/076,984

(22) Filed: Mar. 22, 2016

(65) Prior Publication Data
US 2017/0273242 A1    Sep. 28, 2017

(51) Int. Cl.
| A01B 59/06 | (2006.01) |
| A01B 59/043 | (2006.01) |
| A01B 63/02 | (2006.01) |
| A01B 63/118 | (2006.01) |
| A01D 67/00 | (2006.01) |
| A01D 69/03 | (2006.01) |
| A01D 101/00 | (2006.01) |

(52) U.S. Cl.
CPC .......... *A01D 67/005* (2013.01); *A01D 69/03* (2013.01); *A01D 2101/00* (2013.01)

(58) Field of Classification Search
CPC ... A01B 59/062; A01B 59/006; A01B 71/063; A01B 59/042; A01B 59/064; A01D 41/16; B60D 1/04; B60D 1/141; B60D 1/28
USPC .................. 172/439, 272, 449, 275; 280/508
See application file for complete search history.

(56) References Cited

U.S. PATENT DOCUMENTS

| 2,681,813 | A | * | 6/1954 | Seeburger | ............ | A01B 59/042 172/272 |
| 3,220,751 | A | * | 11/1965 | Tweedale | ............. | A01B 59/062 172/272 |
| 3,324,637 | A | * | 6/1967 | Windsor | ................ | A01D 41/16 56/15.6 |
| 3,384,937 | A | * | 5/1968 | Muncke | ............... | A01B 59/004 172/439 |
| 3,431,711 | A | * | 3/1969 | Claas | ..................... | A01D 41/12 56/14.5 |
| 3,488,930 | A | * | 1/1970 | Feldmann | .............. | A01D 41/16 56/11.9 |
| 3,498,638 | A | * | 3/1970 | Magruder | ............ | A01B 59/062 172/272 |
| 3,531,140 | A | * | 9/1970 | Fadden | ................ | A01B 59/062 172/275 |
| 3,561,789 | A | * | 2/1971 | Stikeleather | ......... | A01B 59/062 172/272 |
| 3,829,128 | A | * | 8/1974 | Sutton | .................... | B60D 1/141 172/272 |

(Continued)

FOREIGN PATENT DOCUMENTS

DE           44 37 587 A1    5/1995

*Primary Examiner* — Arpad Fabian-Kovacs
(74) *Attorney, Agent, or Firm* — Patrick M. Sheldrake

(57) ABSTRACT

A header is removably attached to lift arms of an agricultural harvester and by a tilt cylinder pivotable about an axis A between an elevated installation position and a lower operational position. A perch assembly including a perch is positioned adjacent axis A to remotely pivot the tilt cylinder between the installation and operating positions and a downwardly facing hook shaped latching device is mounted on the tilt cylinder to engage and attach to a mounting pin on the header.

18 Claims, 5 Drawing Sheets

(56) References Cited

U.S. PATENT DOCUMENTS

| | | | | |
|---|---|---|---|---|
| 3,889,980 A * | 6/1975 | Geisthoff | A01B 59/004 | 172/449 |
| 3,977,698 A * | 8/1976 | von Allworden | A01B 59/006 | 172/272 |
| 4,090,725 A * | 5/1978 | Perin | A01B 59/062 | 172/272 |
| 4,108,464 A * | 8/1978 | von Allworden | A01B 59/006 | 280/508 |
| 4,157,838 A * | 6/1979 | von Allworden | B60D 1/04 | 280/508 |
| 4,176,727 A * | 12/1979 | Perin | A01B 59/062 | 172/125 |
| 4,280,317 A * | 7/1981 | Lindblom | A01D 41/16 | 56/15.6 |
| 5,029,650 A * | 7/1991 | Smit | A01B 59/062 | 172/272 |
| 5,497,835 A * | 3/1996 | Laubner | B60D 1/04 | 172/272 |
| 6,349,959 B2 * | 2/2002 | Schlegel | A01B 59/006 | 116/284 |
| 6,478,094 B2 * | 11/2002 | Alexander | A01B 59/006 | 172/272 |
| 6,896,070 B2 * | 5/2005 | Wood, Jr. | B60D 1/141 | 172/272 |
| 7,225,883 B2 * | 6/2007 | Yamada | B60D 1/04 | 172/272 |
| 7,404,448 B2 * | 7/2008 | Tuttle | B60D 1/04 | 172/439 |
| 7,552,578 B2 | 6/2009 | Guske | | |
| 7,600,574 B2 | 10/2009 | Chauvel | | |
| 7,661,251 B1 | 2/2010 | Sloan et al. | | |
| 8,631,634 B2 * | 1/2014 | Vereecke | A01D 41/16 | 56/14.9 |
| 2016/0165796 A1 * | 6/2016 | Carpenedo | A01D 41/16 | 56/14.7 |

* cited by examiner

TILT CYLINDER REMOTE ATTACHMENT APPARATUS

BACKGROUND OF THE INVENTION

1. Field of the Invention

The present invention relates to agricultural harvesters, and more specifically to apparatus for removably attaching a header to such harvesters.

2. Description of the Related Art

In the quest for ever increasing operational efficiency, agricultural harvesters incorporate easily removable headers to provide flexibility in the type of crop to be harvested. Along with the flexibility of changing out the header, it has been a goal make the installation and removal as quick as possible but at the same time promoting operator efficiency and comfort.

Existing header assemblies are usually supported by a pair of lower lift arms pivotally secured to the main body of the agricultural harvester and a third arm between and above the lower lift arms. The lift arms are pivotable through appropriate actuators to change the height of the header relative to the ground to facilitate harvesting of varied crops. The connection between the lift arms and the header is accomplished by upwardly facing U-shaped recesses on the ends of the lift arm which mate with corresponding mounting pins on the header. In order for the mounting pins, and thus the header, to be safely secured to the agricultural harvester, a locking bar mounted on the lift arms is slidable between an unlocked position permitting installation and removal of the mounting pins and a locked position where the pins are captured in the U-shaped recesses.

The third arm connecting the header to the agricultural harvester is connected to an actuator frequently referred to as a tilt cylinder having a hydraulic cylinder secured to the agricultural harvester and an extensible rod connectable by a pin to the header. The overall length of the tilt cylinder is varied to change the attitude of the header for the appropriate harvesting conditions. When the header is being coupled to the agricultural harvester, it is currently a multi-step process in which the operator manually positions the tilt cylinder in an elevated position out of the way of the lift arms. The operator then drives the agricultural harvester to a point where the lift arms may be attached to the lower portion of the header. At that point a third step is required for the operator to manually lower the tilt arm so that an appropriate fitting, such as a Heim joint, lines up to connect with the appropriate element on the header by means of a removable pin. Subsequently, the operator must then re-enter the operator cab to proceed with the harvesting function. The requirement for the multi steps of exiting and entering the cab take away from the efficiency of the overall harvesting process which can result in reduced economic gain.

Accordingly, what is needed in the art is an apparatus for remotely and positively connecting the tilt cylinder of an agricultural harvester to a header.

SUMMARY OF THE INVENTION

In one aspect of the present invention, the above objects are achieved by a mechanism that permits remote attachment of the tilt cylinder.

In one form, the invention is an apparatus for remotely attaching a tilt cylinder to the connecting pin of an agricultural header with the tilt cylinder having a hydraulic cylinder pivotally mounted on an agricultural harvester about an axis A and a rod extendable from the cylinder for connection to the connecting pin. The apparatus includes a perch assembly positioned adjacent the pivotal axis A and connectable with the tilt cylinder to pivot the tilt cylinder in an arc between an elevated installation position and a lower operational position. A downward facing hook is provided on the tilt cylinder for engaging the pin on the agricultural header when the perch assembly pivots the tilt cylinder between the elevated installation position and the lower operational position.

In another form, the invention is an agricultural harvester having a frame, ground drive wheels connected to the frame for ground movement, a header removably attached to the frame for harvesting agricultural crops with the header having at least one mounting pin. A tilt cylinder is pivotally mounted to the frame about an axis A with the tilt cylinder having hydraulic cylinder and an extendable rod. A perch assembly is positioned adjacent the pivotal axis A and is connectable to the tilt cylinder to pivot the tilt cylinder in an arc between an elevated installation position and a lower operational position. A downward facing hook on the tilt cylinder is engagable with the pin on the agricultural header when the perch assembly pivots the tilt cylinder between the elevated installation position and the lower operational position.

One advantage of the present invention is that the tilt cylinder of an agricultural harvester may be remotely manipulated between an installation and an operational position.

Another advantage is that an operator does not have to leave an operator cab when attaching the tilt cylinder to the header of an agricultural harvester.

Still another advantage of the present invention is the positive placement of the tilt cylinder relative to the header during the installation operation.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates embodiment of the invention and such exemplification is not to be construed as limiting the scope of the invention in any manner.

DETAILED DESCRIPTION OF THE INVENTION

Figure 1:
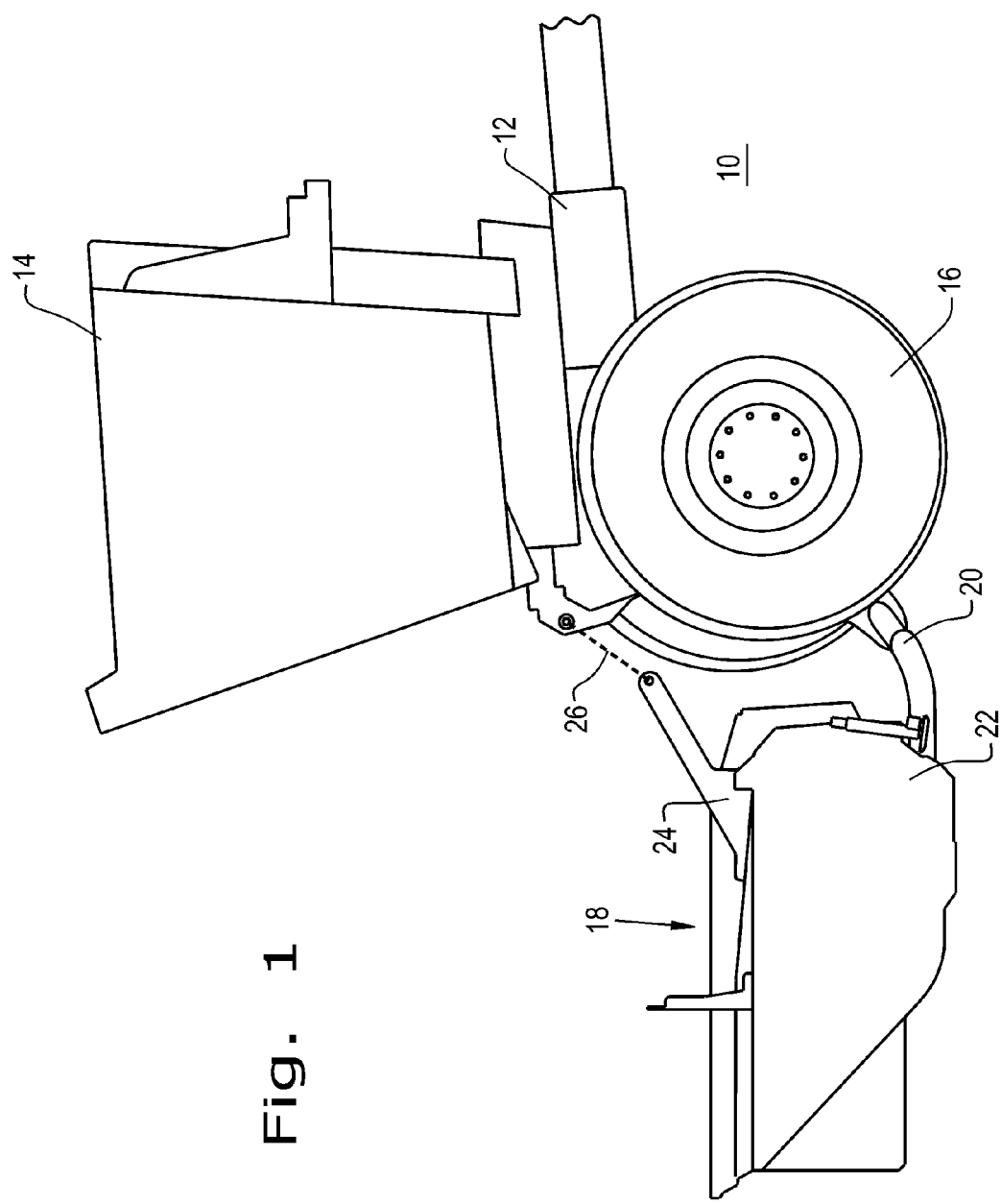
FIG. 1 is an elevational view of a portion of an agricultural harvester and a header with which the present invention may be used.

Referring now to the drawings, and more particularly to FIG. 1, there is shown an agricultural harvester 10 incorporating a frame 12 and an operator cab 14. Ground drive wheels 16 are provided to enable the harvester to traverse a field. A header assembly 18 is removably attached to the agricultural harvester 10 in a manner to be described below. To enable a clear understanding of the present invention, other portions of the agricultural harvester 10 are not shown such as a power unit, drive train and crop processing unit. It is to be understood by those skilled in the art that these may be implemented to complete the function of the agricultural harvester 10 in traversing a field, severing crops and processing them for the grain material.

The header 18 is supported at its bottom edge by lift arms 20 secured to the forward portion of agricultural harvester 10. The header 18 has a frame 22 and a central arm 24 which connects to an actuator 26 known as a tilt cylinder shown as a dashed line extending to frame 12.

Figure 2:
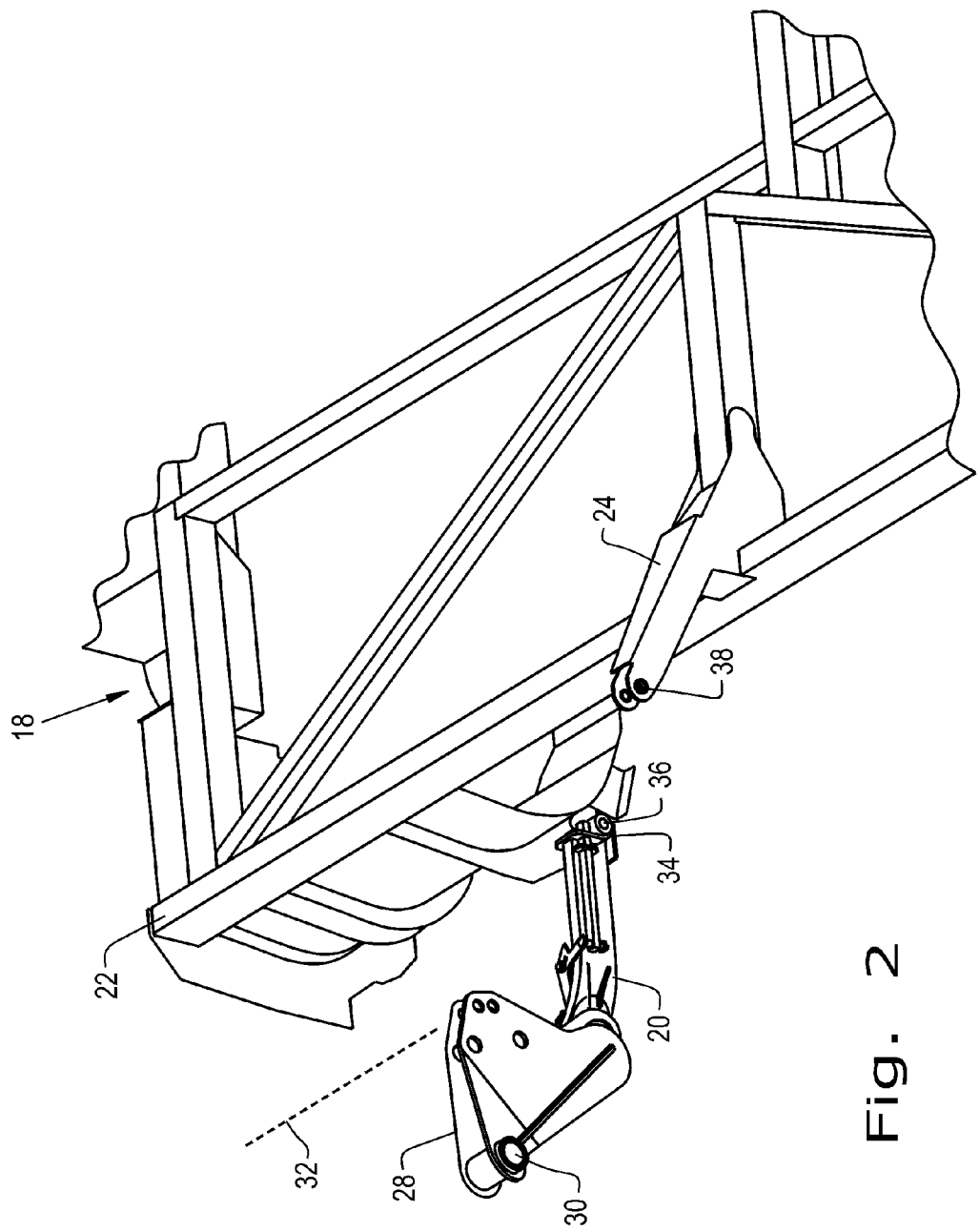
FIG. 2 is a perspective view of a portion of the agricultural harvester of FIG. 1 showing the interconnection between the header and the agricultural harvester.

Referring particularly to FIG. 2, each lift arm 20 is connected to a plate 28 that is pivotally mounted to agricultural harvester 10 at 30 and which is connected to an actuator 32, shown as dashed line, to pivot the plate 28 and lift arm 20 about pivot point 30. The lift arm 20 has an upwardly facing U-shaped recess 34 at its far end which receives a mounting pin 36 secured to the rearward face of frame 22. The upwardly facing U-shaped recess 34 enables the header 18 to be connected and disconnected to the agricultural harvester 10.

Figure 3:
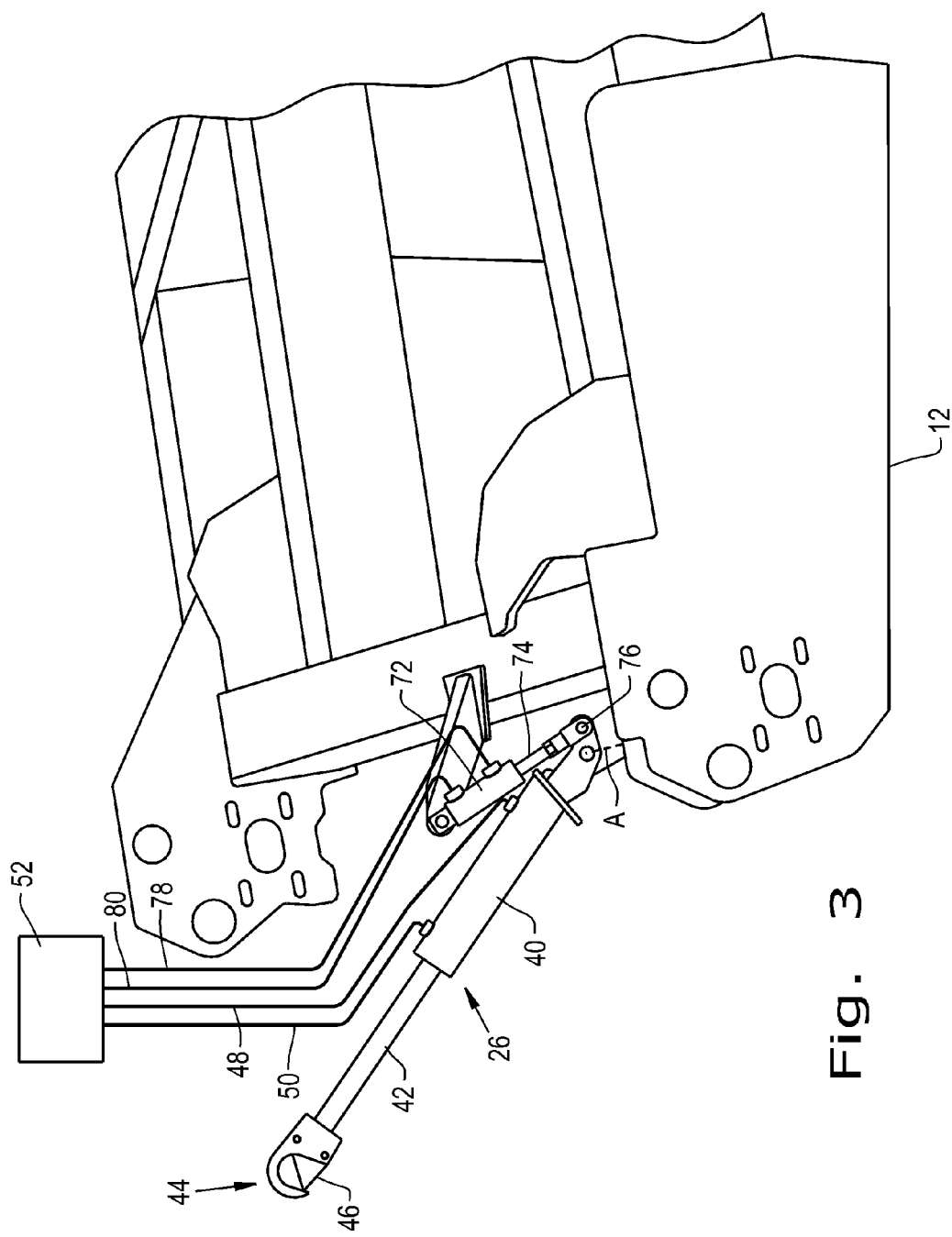
FIG. 3 shows a perch assembly embodying the present invention in place on the agricultural harvester of FIGS. 1 and 2.

Referring now to FIG. 3 the tilt cylinder 26 is illustrated. Tilt cylinder 26 comprises a hydraulic cylinder 40 having an extendable rod 42 connected to an internal piston (not shown) for varying the overall length of the tilt cylinder. The end of the extendable rod 42 has a hook assembly 44 with a downward facing hook and a finger latch 46 that allows the downward facing hook assembly 44 to embrace a cross pin, such as the pin 38, and spring back to its illustrated position to lock it in place. The cylinder 40 has a head or barrel end hydraulic line 48 connected to its barrel end and a rod end hydraulic line 50 connected to the rod end for supplying hydraulic fluid at an appropriate pressure. Lines 48 and 50 extend to a controller schematically illustrated at 52 for a function to be later described.

Figure 4:
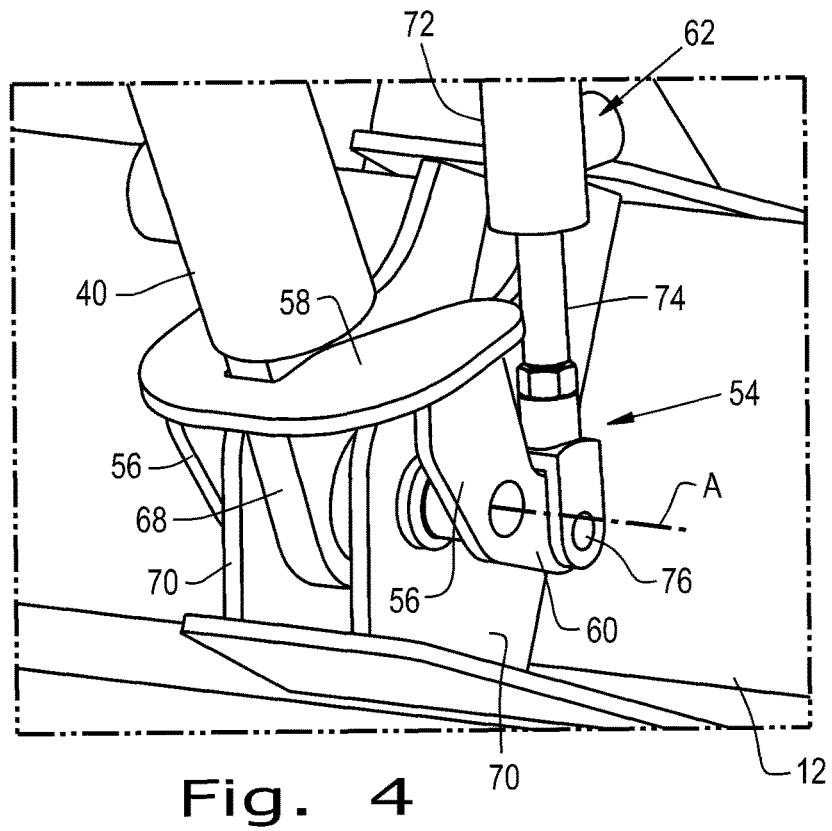
FIG. 4 is an expanded partial view of the perch assembly of FIG. 3.
Figure 5:
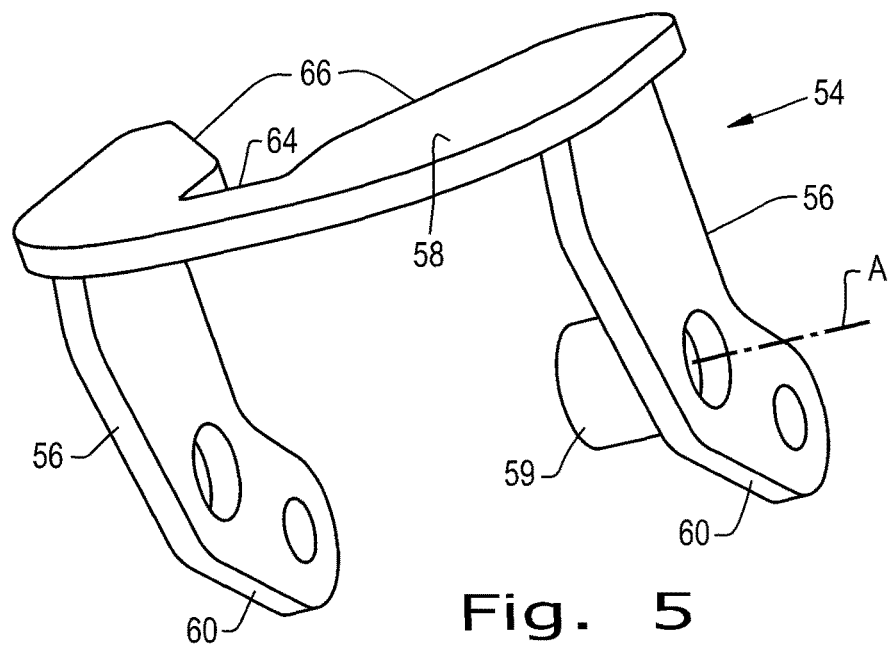
FIG. 5 is a perspective detailed view of a portion of the perch assembly of FIGS. 3 and 4.

In accordance with the present invention, a perch assembly 54 illustrated in FIGS. 4 and 5 is employed to allow the tilt cylinder 26 to be remotely connected to the header 18, including avoiding the need to leave the operator cab 14. In FIG. 4, the hydraulic cylinder 40 has an integral plate 68 at its base that is positioned between a pair of actuator supports 70 appropriately secured to frame 12 to mount the tilt cylinder 26 for pivoting movement about axis A through an appropriate pin.

The perch assembly 54 includes a pair of arms 56 extending from and pivotally connected to frame 12 about axis A to a cross perch 58 in the form of a plate. As shown particularly in FIG. 5, the cross perch 58 has a central recess 64 which conforms to the cross-sectional shape of plate 68 to accurately position the tilt cylinder 26 relative to the agricultural harvester and the header 18. Recess 64 is intersected by a pair of ramps 66 that allow the plate 68 to be accurately and positively directed into recess 64 as the perch assembly 54 is moved to an elevated installation position. A bushing 59 is attached to one of the arms 56 to provide sufficient clearance away from the actuator supports 70 for articulated movement. The arms 56 each have a crank arm 60 extending radially outward from axis A to enable pivotal movement of perch assembly 54 from a perch actuator 62, particularly shown in FIGS. 3 and 4.

The perch actuator 62 may be employed in one of a number of different forms. For example, it may be electric, pneumatic, a linear motor, all with the purpose of manipulating the perch assembly 54 to elevate the tilt cylinder 26 to a position where it does not interfere with the lift arms 20 for the header 18. The actuator may be conveniently controlled from the operator cab thereby eliminating the need for the operator to dismount.

Figure 6:
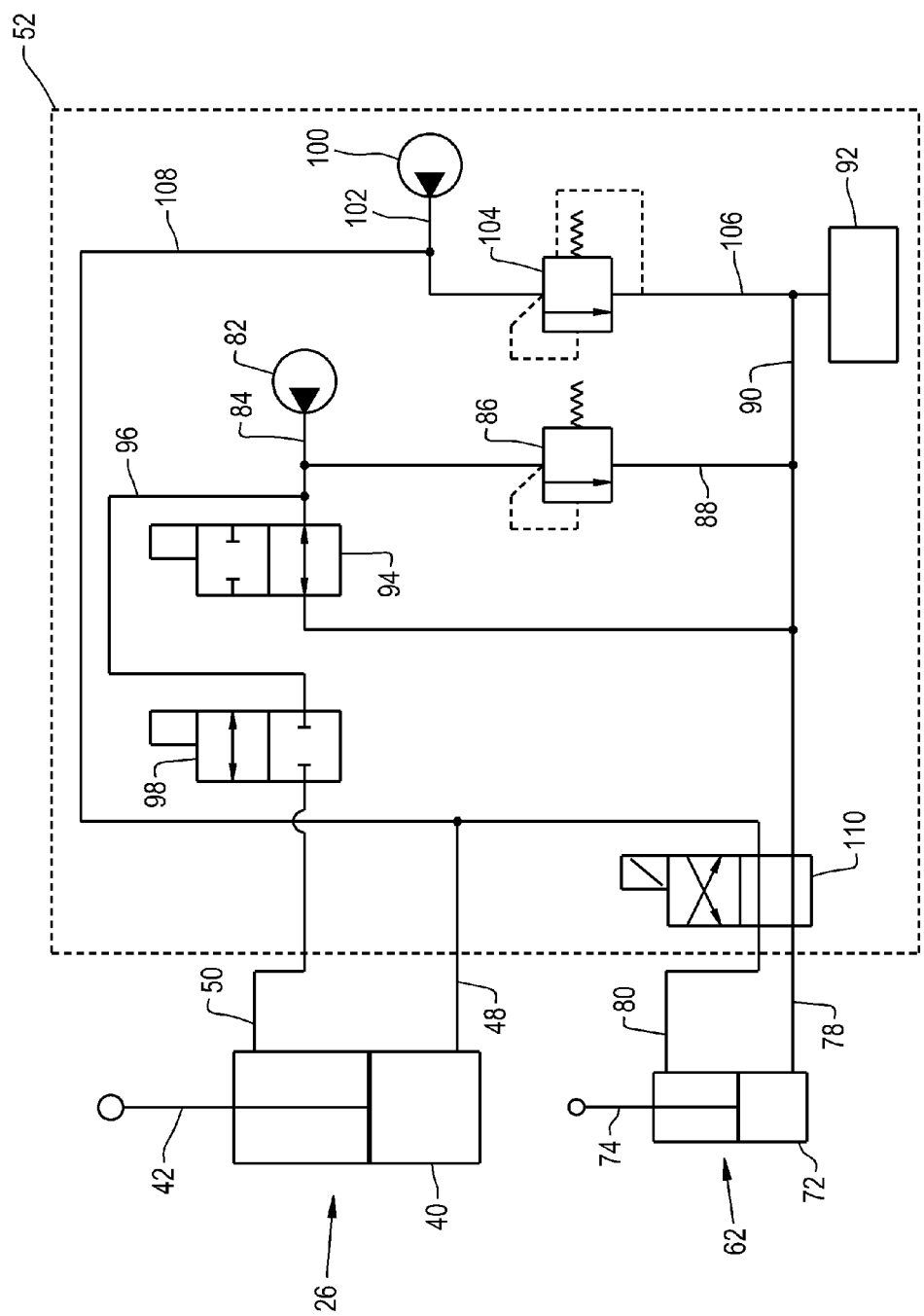
FIG. 6 is a schematic view of a hydraulic control system used with the present invention.

Although the other forms of the perch actuator 62 may be employed, it is shown herein as a hydraulic actuator, particularly shown in FIG. 6 and in FIG. 3. Referring first to FIG. 3, the perch actuator 62 includes a hydraulic cylinder 72 and an extendible rod 74 connected to crank arm 60 by a connecting pin 76. A barrel end 78 hydraulic line and a rod end hydraulic line 80 are each connected to the control system 52, herein illustrated as a hydraulic control system.

The hydraulic control system 52 includes a lift pump 82 providing pressurized fluid to an output line 84 and whose pressure is regulated by pressure regulator 86 and return line 88 which extends to a drain line 90 and then to a reservoir 92. Output line 84 extends to a valve 94 that controls a portion of the output of the lift pump 82. Line 96 connects with output line 84 and extends to a tilt cylinder valve 98 that prevents or allows flow to the rod end line 50 of the tilt cylinder 26.

A charge pump 100 pressurizes fluid for delivery to an output line 102 and whose pressure is regulated by a pressure regulator 104 connected to return line 106 that leads to reservoir 92. Nominally, the output pressure of the lift pump 82 is regulated to about 3200 psi and the output pressure of charge pump 100 is regulated to about 400 psi. Output line 102 connects with line 108 that connects with the barrel end line 48 of the tilt cylinder 26 and to a valve 110 that is connected to the barrel end line 78 and rod end line 80 of the perch actuator 62.

In operation, the agricultural harvester 10 is directed to the header 18 and the lift arms 20 engaged. At this point, the tilt cylinder 26 is to be elevated to a point where it is out of the way of the connecting pin 38 on arm 24 of header 18. The operator activates the perch valve 110 from its illustrated deenergized position into a position where the charge pressure from pump 100 is directed to the barrel end of perch actuator 62 and the rod end line 80 is directed to the drain line 90 this causes the rod 74 to be extended to its maximum length which, in turn, pivots the perch assembly 54 to an elevated position for installation of the header 18. In this position, the downward facing hook 44 is above the connecting pin 38 of header 18. It is assumed, that in this position, the tilt cylinder is extended sufficiently for the hook 44 to be beyond the mounting pin 38. When the operator is ready to lower the tilt cylinder 26 to engage the pin 38, the perch valve 110 is deenergized which then provides, in the illustrated position in FIG. 6 charge pressure to the rod end of perch actuator 86 and connects the barrel end to drain line 90. This cause the perch actuator 62 to positively lower the perch assembly 54 to its lower operational position that permits normal operation of the tilt cylinder.

At this point, the tilt cylinder 26 will be resting on the pin 38 and the operator will retract the tilt cylinder 26 by energizing the master valve 94 and valve 98 to provide lift pressure to the rod end of the tilt cylinder 26 which retracts and causes the latch 46 on the downward facing hook 44 to engage and lock with the mounting pin 38. During normal operation of the agricultural harvester 10, the master valve 94 and tilt cylinder valve 98 are de-energized which locks the position of the tilt cylinder 26 and returns the lift pressure flow to the reservoir 92. The tilt cylinder 26 may be extended by energizing the tilt cylinder valve 98 only, allowing flow from the rod end of tilt cylinder 26 to the reservoir 92.

The valves 94, 98 and 110 are illustrated as solenoid valves that may be conveniently controlled by electrical signals generated in operator cab 14. Such controls are not illustrated to enable a clearer understanding of the invention.

The above arrangement allows for a remote connection of the tilt cylinder 26 to the header 18 without the need for an operator to dismount from the operator cab 14. This greatly increases the overall efficiency of the agricultural harvesting operation. The perch assembly 54, by virtue of the recess 64 and ramps 66, provides a positive and accurate alignment with tilt cylinder 26 as it is being moved to its elevated installation position. Such accuracy is necessary to result in correct and repeatable placement of the downward facing hook 44 and latch 46 with the pin 38. Furthermore, when the perch assembly 54 is in its lower operational position it is positively held there by the hydraulic system pressure to prevent any contamination which may affect efficient operation.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural harvester comprising:
   a frame
   a tilt cylinder having a hydraulic cylinder pivotally connected to the frame and a rod extendable from said cylinder configured for connection to a connecting pin of an agricultural header;
   a perch assembly connected to said frame and connectable with said tilt cylinder to pivot said tilt cylinder in an arc between an elevated installation position and a lower operational position; and
   a downward facing hook on said tilt cylinder configured for engaging the pin when said perch assembly pivots said tilt cylinder between the elevated installation position and the lower operational position.

2. The agricultural harvester as claimed in claim 1, wherein said perch assembly comprises a pair of arms extending from a common pivot axis A and a cross perch for capturing the lower side of the tilt cylinder, a crank arm and a perch actuator, said crank arm being connectable to said perch actuator for pivoting said perch assembly between an elevated installation position and a lower operational position.

3. The agricultural harvester as claimed in claim 2, wherein said perch actuator is hydraulically actuated.

4. The agricultural harvester as claimed in claim 3, wherein the tilt cylinder has a charge pressure circuit and said perch actuator is connected to be displaced by hydraulic fluid in said charge pressure circuit.

5. The agricultural harvester as claimed in claim 4, further comprising a valve connected between a rod and a barrel end of said perch actuator to direct pressure from said charge pressure circuit to one of the barrel and rod end of said perch actuator.

6. The agricultural harvester as claimed in claim 2, wherein said cross perch has a central recess in line with said tilt cylinder and ramps tapering to said recess for aligning the hydraulic cylinder of said tilt cylinder to the recess.

7. The agricultural harvester as claimed in claim 2, wherein the axis of rotation of said perch assembly is coaxial with axis A.

8. The agricultural harvester as claimed in claim 1, wherein said hook has a latching mechanism to capture and lock to the pin on said agricultural header.

9. The agricultural harvester as claimed in claim 8, wherein said latching mechanism comprises a arcuate member spring loaded to close the hook and yieldable to permit entry over the pin when said tilt cylinder is pivoted between the upper installation position and the lower operational position.

10. An agricultural harvester comprising:
    a frame;
    ground drive wheels connected to said frame for ground movement;
    a header removably attached to said frame for harvesting agricultural crops, said header having at least one mounting pin;
    a tilt cylinder pivotally mounted to said frame about an axis A, said tilt cylinder having a hydraulic cylinder and an extendable rod;
    a perch assembly positioned adjacent said pivotal axis A and connectable with said tilt cylinder to pivot said tilt cylinder in an arc between an elevated installation position and a lower operational position; and
    a downward facing hook on said tilt cylinder for engaging said at least one mounting pin on said agricultural header when said perch assembly pivots said tilt cylinder between the elevated installation position and the lower operational position.

11. The agricultural harvester as claimed in claim 10, wherein said perch assembly comprises a pair of arms extending from a common pivotal axis, a cross perch for capturing a lower side of said tilt cylinder, a crank arm and a perch actuator connected to said crank arm for pivoting between the installation and operational position.

12. The agricultural harvester as claimed in claim 11, wherein the perch actuator is hydraulic.

13. The agricultural harvester as claimed in claim 12, further comprising a charge pressure hydraulic circuit for said tilt cylinder and said perch actuator is connected to receive charge pressure for actuation.

14. The agricultural harvester as claimed in claim 13, further comprising a valve interconnected between said perch actuator and said charge pressure hydraulic circuit to direct pressure to one of a barrel end and a rod end of said perch actuator.

15. The agricultural harvester as claimed in claim 11, wherein said cross perch has a central recess and ramps leading to said recess for aligning the tilt cylinder in said recess when the perch assembly is moved between the installation and operational positions.

16. The agricultural harvester as claimed in claim 10, further comprising a latch mechanism on said downward facing hook for capturing the pin on said header when the tilt cylinder is in its operational position.

17. The agricultural harvester as claimed in claim 16, wherein said latch mechanism comprises and arcuate member spring loaded to close the hook and yieldable to permit entry over the pin when said tilt cylinder is pivoted between the upper installation position and the lower operational position.

18. Apparatus for remotely attaching a tilt cylinder to an agricultural header, comprising:

a tilt cylinder having a hydraulic cylinder for pivotally mounting on an agricultural harvester and a rod extendable from the hydraulic cylinder for connection to a connecting pin of an agricultural header, and wherein the tilt cylinder has a charge pressure circuit;

a perch assembly for mounting on said agricultural harvester and connectable with said tilt cylinder to pivot said tilt cylinder in an arc between an elevated installation position and a lower operational position, said perch assembly comprising a pair of arms extending from a common pivot axis A and a cross perch for capturing the lower side of the tilt cylinder, a crank arm and a hydraulically actuated perch actuator connected to be displaced by hydraulic fluid in said charge pressure circuit, said crank arm being connectable to said perch actuator for pivoting said perch assembly between the elevated installation position and the lower operational position; and a downward facing hook on said tilt cylinder for engaging the connecting pin on said agricultural header when said perch assembly pivots said tilt cylinder between the elevated installation position and the lower operational position.

\* \* \* \* \*